Dec. 24, 1935.　　　　L. F. CARTER ET AL　　　　2,025,194
DIRECTIONAL GYROSCOPE
Filed Nov. 3, 1933　　　　2 Sheets-Sheet 1

INVENTORS
LESLIE F CARTER &
DANIEL C DUNDON
BY Herbert H. Thompson
THEIR ATTORNEY.

Dec. 24, 1935.  L. F. CARTER ET AL  2,025,194
DIRECTIONAL GYROSCOPE
Filed Nov. 3, 1933    2 Sheets-Sheet 2
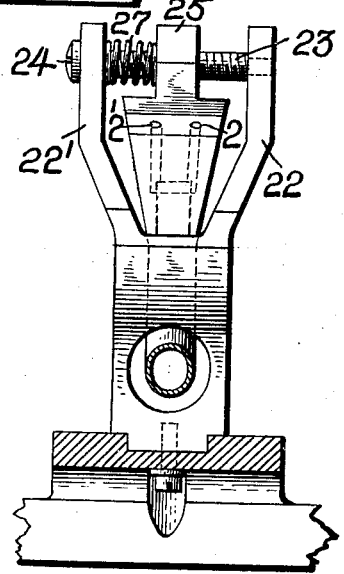
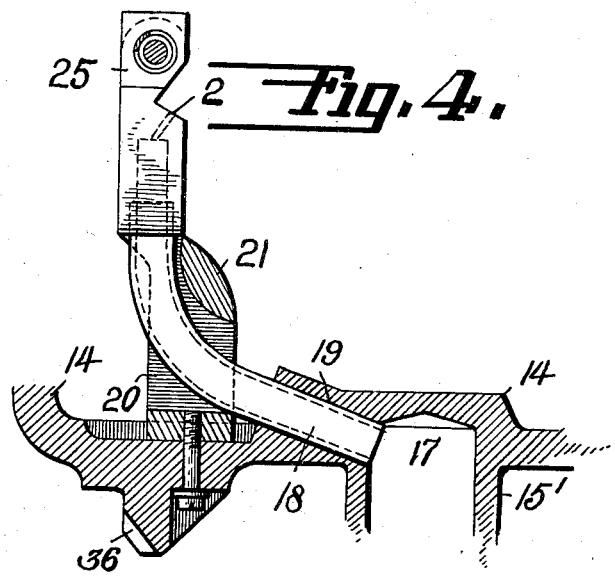
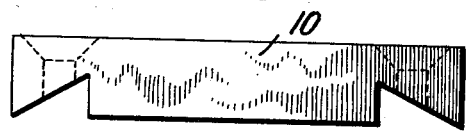
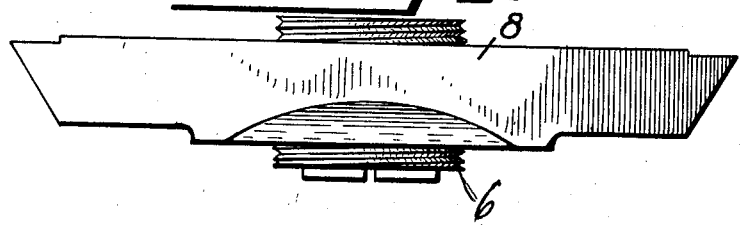
INVENTORS
LESLIE F CARTER
DANIEL C DUNDON
BY
THEIR ATTORNEY.

Patented Dec. 24, 1935

2,025,194

UNITED STATES PATENT OFFICE 2,025,194

DIRECTIONAL GYROSCOPE

Leslie F. Carter, Leonia, N. J., and Daniel C. Dundon, Floral Park, N. Y., assignors to Sperry Gyroscope Company, Inc., Brooklyn, N. Y., a corporation of New York Application November 3, 1933, Serial No. 696,522

2 Claims. (Cl. 74—5)

This invention relates to improvements in gyroscopic apparatus especially designed for use as aircraft instruments. It relates particularly to directional gyroscopes in which perfect balance and freedom of the bearings must be maintained under great temperature changes and the position of the air jets which both drive and erect the gyroscope maintained with great accuracy.

Referring to the drawings showing one form our invention may assume:

Fig. 3 is an end elevation showing the adjustable support for the air nozzles on a larger scale.

Fig. 4 is a side elevation of the same with parts shown in section.

Fig. 5 is a detail of one of the parts used to make up the compensated rotor bearing ring.

Fig. 6 is a detail of one of the side members of said ring.

Figure 1:
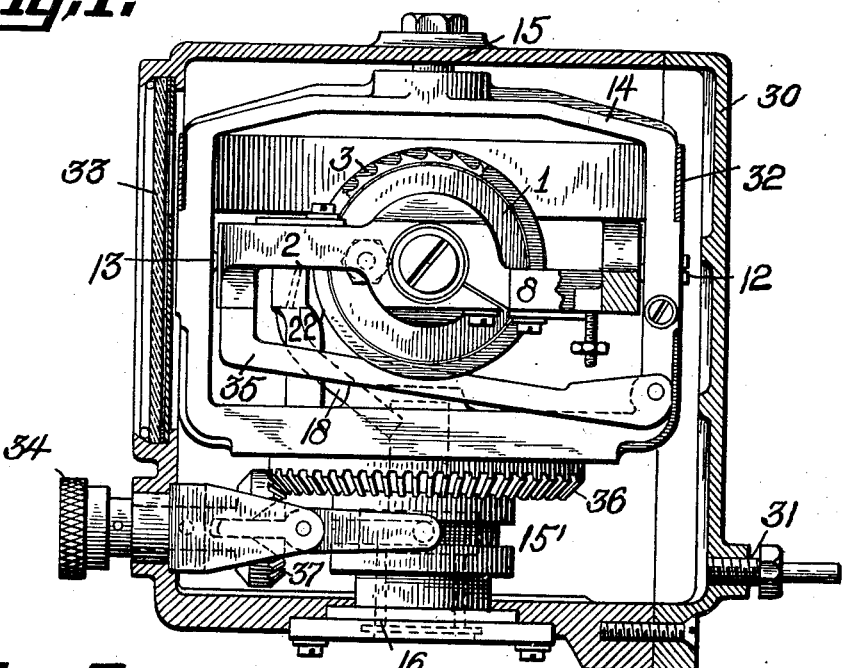
Fig. 1 is a side elevation of a directional gyroscope with the outer casing shown in section.
Figure 2:
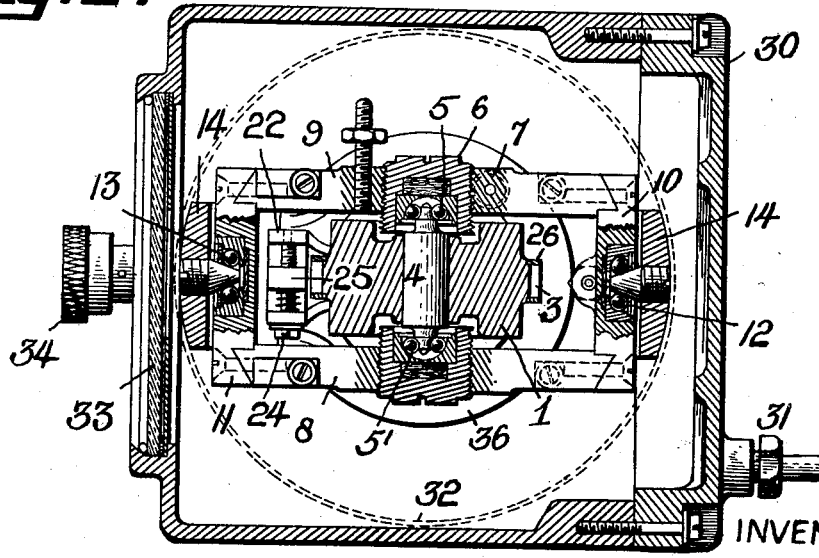
Fig. 2 is a horizontal section of the same.

The gyroscopic instrument to which our invention is shown applied is a directional gyroscope of the general form shown in the prior patent of Bert G. Carlson, No. 1,982,637, dated December 4, 1934, for Directional gyroscopes in which the gyro rotor 1 is air spun from an air nozzle or nozzles 2 and 2', the air jets from which strike the buckets 3 on the periphery of the rotor. Said rotor may be made of brass or other heavy metal and is shown as provided with a steel shaft 4 preferably of high carbon steel. Said shaft is journalled in ball bearings 5 and 5' which are housed in threaded bushings 6 in the rotor bearing frame 7. In order to keep the weight of such instruments as low as possible, it is usual to construct as many parts as possible of an aluminum alloy. Heretofore the practice has been to cast such rotor bearing ring of aluminum alloy in one piece but such construction gave rise to difficulties when the instruments were flown at high altitudes and extremely low temperatures, the aluminum frame contracting faster than the steel shaft and causing the bearings to bind and also disturbing the balance of the wheel about its horizontal and vertical pivots.

To overcome these troubles, we prefer to build up the rotor bearing ring in several pieces. The main side pieces 8 and 9 we still make of aluminum but we make the end pieces 10 and 11, which extend parallel to the shaft 4, of steel, the coefficient of expansion of which is such that the total expansion and contraction occurring is substantially the same as occurs in the shaft 4 so that the bearing clearances remain unaffected by temperature changes. The simplest design is to employ the same material for the rotor shaft and end pieces.

The rotor bearing ring is supported for oscillation about the horizontal axis by bearings 12, 13 in the vertical ring 14 which in turn is supported to turn about a vertical axis by suitable bearings 15 and 15'. Air is supplied to the nozzles 2 and 2' for spinning the rotor through passages 16 leading through the lower bearing 15' as shown in dotted lines and through the hollow portion 17 in a downward extension of the vertical ring 14. Leading from said portion 17 is a tube 18 which may be loosely or swivelly mounted in a substantially horizontal or slightly inclined bore 19 in the base of the vertical ring. Said tube is bent upwardly and passes through a hole 20 in a bracket 21 secured to the vertical ring. Said bracket is forked at its upper end as at 22, 22' across which is shown extending a threaded shaft 23, said shaft being rotatably mounted in said fork and provided with a slotted end 24 so that it may be turned by a screw driver. Threaded on said shaft is a member 25 which said tube 18 enters at its base and which is provided with the above described nozzles 2 and 2' positioned closely adjacent the periphery of the rotor. The purpose of this construction is to accurately adjust the position of the air jets with respect to the rotor so that the jets may strike the rotor closely adjacent the end walls 26 of the blades so that the rotor is kept exactly horizontal by the erecting action of the jets as explained in the aforesaid patent of Bert G. Carlson. A compression spring 27 may be provided for taking up any lost motion that may exist between the threads on the shaft 23 and part 25. It will be noted that by the substantial bend in the tube 18 amounting to nearly 90°, adjustment of the nozzles will not distort or strain the tube but will only turn the lower end of the tube 18 in its bushing 19.

In the embodiment shown, the entire gyroscope is enclosed within a casing 30 from which air is exhausted in operation through coupling 31. The compass card 32 mounted on the vertical ring is viewed through the front window 33 and the gyroscope may be set from time to time through the setting knob 34 which operates both to lock the gyroscope about its horizontal axis through the locking arm 35 and to rotate the same about the vertical axis through bevel gear and pinion 36 and 37 as explained in detail in the aforesaid application of Bert G. Carlson.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. In a directional gyroscope, an air spun gyro-rotor, a rotor bearing ring therefor, a vertical ring in which said gearing ring is mounted for oscillation about a horizontal axis, an outer casing, vertical bearings mounting said vertical ring for turning in said casing, at least one of said bearings being hollow for admitting the spinning air, a nozzle containing member mounted in said vertical ring and comprising a tube entering said hollow bearing at one end, and means for adjusting the nozzle end thereof in a general axial direction adjacent the periphery of the rotor and without distorting said tube.

2. In a directional gyroscope, an air spun gyro-rotor, a rotor bearing ring therefor, a vertical ring in which said bearing ring is mounted for oscillation about a horizontal axis, an outer casing, vertical bearings mounting said vertical ring for turning in said casing, at least one of said bearings being hollow for admitting the spinning air, a nozzle containing member mounted in said vertical ring and comprising a tube loosely entering said hollow bearing at one end at a substantial angle to said nozzle end, and means for laterally adjusting the nozzle end thereof by swiveling the first named end thereof in said hollow bearing.

LESLIE F. CARTER.
DANIEL C. DUNDON.